Figure 2:
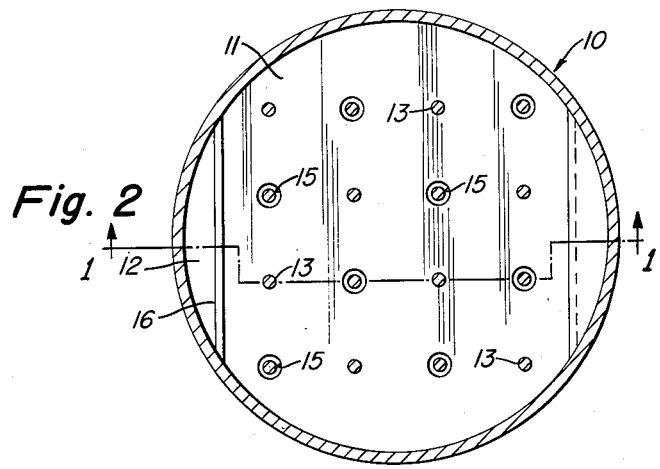

May 8, 1962     H. M. BELKIN     3,033,541

VAPOR-LIQUID CONTACTING

Filed Sept. 19, 1957

INVENTOR.
Harold M. Belkin
BY
*Everett A. Johnson*
ATTORNEY

United States Patent Office 3,033,541
Patented May 8, 1962

3,033,541
VAPOR-LIQUID CONTACTING
Harold M. Belkin, Caracas, Venezuela, assignor to Standard Oil Company, Chicago, Ill., a corporation of Indiana
Filed Sept. 19, 1957, Ser. No. 684,960
2 Claims. (Cl. 261—112)

This invention relates to an apparatus for contacting a plurality of fluids and relates more particularly to the contacting of liquids with gasiform fluids or with immiscible or partially immiscible liquids.

Material transfer between phases is one of the most important operations in chemical processing and, therefore, there exists an ever-present need for improved equipment to perform this function. The system is adaptable to the treatment of a great variety of fluids and is characterized by the efficiency of contact between the fluids while avoiding disabilities of prior systems.

It is well recognized that in conventional contacting columns the active regions for contact between liquid and gasiform materials are relatively small compared to the total cross-section of a contacting tower. On the other hand, packed towers are unstable in operation and can be operated only under closely controlled conditions. Furthermore, contacting equipment heretofore used has been characterized by poor mass transfer in the vapor phase, and has not been well adapted for high liquid flow rates.

It is, therefore, a primary object of this invention to provide an inexpensive and rugged apparatus wherein the mass transfer is greatly increased and wherein high liquid flow rates may be used. It is a further object of the invention to provide an apparatus wherein the skin friction of a flowing liquid film and the friction between liquid and vapor produce useful turbulence adapted to improve mass transfer in the vapor phase. A more particular object of the invention is to provide a system which is easy to construct and maintain and which is stable and repetitive in operation. These and other objects of my invention will become apparent as my description thereof proceeds.

Briefly, I attain the objects of the invention by providing a construction which comprises a series of laterally spaced, longitudinally extending rods which pass through aligned ports in transverse plates or trays. The ports are so arranged that the liquid flowing downwardly along a rod is collected on alternate plates and redistributed to another rod for transfer to the next subjacent tray. The rods guide the liquid and produce turbulence in the flowing liquid and the collected liquid level is maintained on each plate or tray by a series of dams. The vapor, on the other hand, is made to flow transverse to the rods and over the collected liquid in a given tray.

In accordance with this invention, one of the fluids is formed into a guided free film and turbulence is developed in the liquid and vapor phases. The guided film is intimately contacted with a second fluid and the fluids are thereafter separated. The increased turbulence during the contacting increases material transfer between the phases and hence a more efficient vapor-liquid contacting device is produced. An important feature of the device is the use of skin friction on a falling liquid film to create the turbulence in the film which in turn produces turbulence in the vapor phase.

Figure 1:
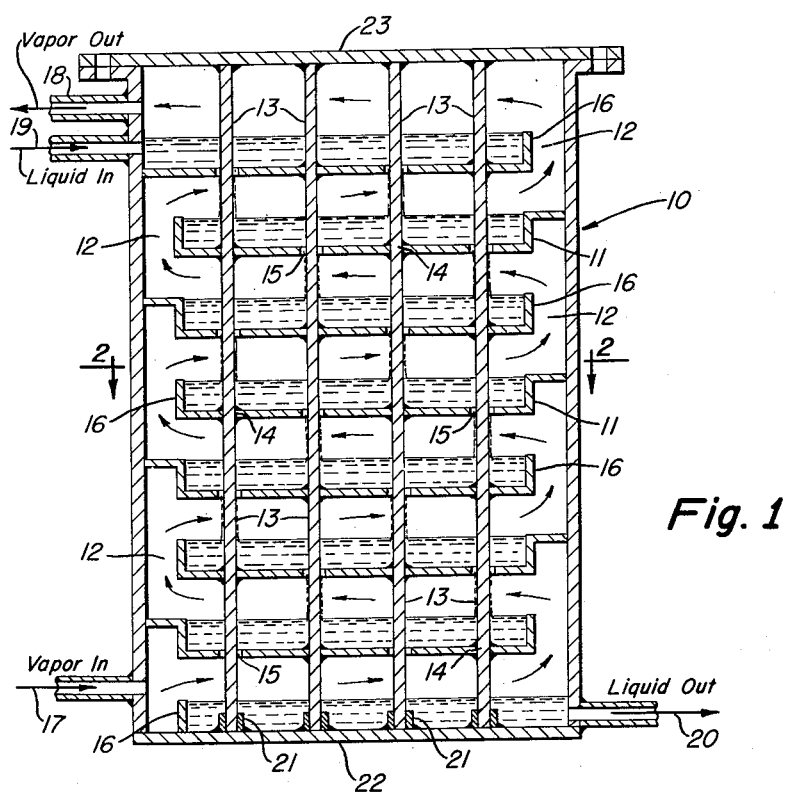

Further details and advantages of my invention will be described by reference to the accompanying drawing which illustrates an embodiment thereof and wherein:

FIGURE 1 is a vertical section; and
FIGURE 2 is a section taken along the line 2—2 in FIGURE 1.

Referring to the drawing, a tower 10 is provided with a plurality of plates 11 which are disposed across the flow area of the tower 10 and in vapor-sealing contact with the inner wall of the tower 10 except for the vapor risers 12 provided by the cut-away portions of the plates 11.

A series of vertical rods 13 pass through anchor ports 14 in the plates or trays 11, alternate rods being fixed to alternate trays 11 whereby the tray assembly is supported by the rods. The larger downcomer ports 15 are so arranged that the liquid flowing down a rod 13 is collected on alternate plates 11 and redistributed to another rod 13 for transfer to a lower plate 11.

In passing down about the downcomer section of a given rod 13 through a downcomer port 15, the liquid is in turbulent flow and the gases passing transverse through the maze of rods 13 between pairs of plates 11 are likewise in turbulence. The liquid level on a given tray or plate 11 is maintained by a series of dams 16 which comprise upstanding wall portions along the edge of the vapor risers 12 on each tray or plate 11. As shown in the drawing, the vapor risers 12 comprise chordal segments arranged 180° from one another in adjacent plates 11 but other arrangements such as 90° and 120° are feasible.

Likewise, the number of downcomers (ports 15 and lengths of rods 13) for a given tray 11 can be equal in number to the supporting rods (fixed to anchor ports 14) as shown in the drawings. However, some advantages can be obtained by having a greater number of downcomers in one level of the tower 10 than in another. If desired, the rods 13 may be provided with finned sleeves (not shown) and the like to direct and control the turbulence of the liquid and of the vapors.

The rods 13 are used to guide the liquid and to produce turbulence in the travelling liquid. The diameter and number of rods 13 used are dependent upon the desired liquid flow rate and the viscosity and density of the liquid. The size of the rods may vary from as little as 0.001 inch to massive structures of about 12 inches. In some instances it may be desirable to construct the rods 13 of hollow tubing and then pass heat exchange media through the tubes. By this means temperature gradients can be created and/or eliminated across individual trays and across the inlet and outlet of the tower 10.

The spacing between the trays 11 is as close as construction will permit, the minimum spacing being limited by the rate of vapor flow. It is contemplated that the tray spacing may be adjusted by the supporting rods 13. One manner in which such adjustment can be made is to employ threaded rods 13 which pass through a cooperating threaded bushing (not shown) in each anchor port 14 and by rotating the rods 13 from the exterior of the tower the relative spacing of the trays 11 may be adjusted. Ordinarily, however, such adjustment will not be desired once the characteristics and operating controls have been established for a particular installation and the rods 13 may be welded in place as shown in the drawing. The rods 13 are supported by the upper hanger plate 23 and may be supported at their lower ends by blind nipples 21 in bottom plate 22.

The downcomer ports 15 together with the rods 13 serve to redistribute the liquid on the plates 11. The diameter and number of ports 15 are dependent upon the desired through-put rate and on the liquid holdup desired on each plate or tray 11. The ratio of the diameter of the downcomer port 15 to the diameter of the rod 13 may be on the order of about 1:5, but the ratio chosen is dependent upon the characteristics of the fluids involved and the type of contacting operation desired.

In operation, one fluid such as a vapor is introduced into tower 10 by inlet line 17 and caused to flow laterally across the tower 10 below tray 11 to the fluid riser 12. The second fluid, comprising a liquid, is introduced into the topmost manifold tray 11 by liquid inlet line 19 and flows generally downward and countercurrent to the first fluid flow, the liquid being withdrawn from the tower 10 by line 20. In traversing the tower 10, the vapors have been brought into contact with the turbulent film of liquid on the downcomer rods 13 exposed in that section of the tower. The vapors then successively pass from stage to stage between adjacent plates 11 and are discharged from the tower 10 by the vapor outlet 18.

Although I have described my invention with reference to an embodiment thereof, it is contemplated that changes can be made in the apparatus and in the mode of using the apparatus without departing from the spirit and scope of the invention. Accordingly, it is contemplated that those skilled in the art will be able to make such other embodiments in view of my description.

What I claim is:

1. Vapor-liquid contacting apparatus comprising a column provided with an upper liquid inlet, a lower liquid outlet, a lower vapor inlet and an upper vapor outlet, a plurality of vertically spaced horizontally disposed liquid-pool-affording plates positioned in said column, each of said plates being provided with a liquid dam adapted to maintain a substantial liquid level thereon, vapor risers provided between said liquid dams and the inner wall of said column, said plates being provided with a plurality if liquid downcomers and anchor ports, said anchor ports being positioned in axial alignment with a downcomer in an above-positioned plate, a vertically disposed rod extending downwardly through such downcomers and secured at said anchor ports, a segment of said rod passing through the downcomer and being in sealing contact with a below-positioned plate at the next subjacent anchor port and adapted to transfer liquid in a downwardly flowing tubular film from one liquid pool to the next lower liquid pool, the arrangement of said liquid-transferring segments being staggered from plate to plate to interrupt the downward flow of said tubular film at said anchor ports and to cause said liquid to flow across said plates from downcomer to downcomer.

2. Vapor-liquid contacting apparatus comprising a column provided with an upper liquid inlet, a lower liquid outlet, a lower vapor inlet and an upper vapor outlet, a plurality of vertically spaced horizontally disposed liquid-pool-affording plates positioned in said column, each of said plates being provided with a plurality of anchor ports and downcomer ports, at least a portion of the periphery of each of said plates being in vapor-sealing contact with the inner wall of said column and a segment of each plate adjacent the wall of said column being removed to provide a vapor riser, a liquid dam at the edge of each of said plates adapted to maintain a substantial liquid level thereon, the position of said vapor risers being staggered from tray to tray to provide a zig-zag course of vapor flow across said plates from riser to riser, a plurality of vertically disposed rods passing through said anchor ports and downcomer ports, the positions of said anchor ports and said downcomer ports being alternated from one plate to the next lower plate, said rods being in sealing contact with said plates at said anchor ports and adapted to transfer a downwardly flowing tubular liquid film through said downcomer ports to a liquid pool on the next lower plate.

References Cited in the file of this patent

UNITED STATES PATENTS

| | | |
|---|---|---|
| 542,626 | Cardozo | July 16, 1895 |
| 1,378,716 | Nielsen | May 17, 1921 |
| 1,694,370 | Burdick | Dec. 11, 1928 |
| 2,054,809 | Fleisher | Sept. 22, 1936 |
| 2,900,799 | Etienne | Aug. 25, 1959 |
| 2,944,966 | Eickmeyer | July 12, 1960 |

FOREIGN PATENTS

| | | |
|---|---|---|
| 32,039 | Switzerland | July 29, 1904 |
| 141,002 | Germany | May 12, 1903 |
| 429,662 | Italy | Feb. 2, 1948 |
| 701,314 | France | Jan. 7, 1931 |